(12) United States Patent
Veenstra et al.

(10) Patent No.: US 12,259,108 B2
(45) Date of Patent: Mar. 25, 2025

(54) LIGHT PROJECTOR WITH OVERMOLDING TO IMPROVE ACCURACY BETWEEN LIGHT SOURCE, APERTURE, AND LENS

(71) Applicant: Innotec, Corp., Zeeland, MI (US)

(72) Inventors: Thomas J. Veenstra, Lakewood, CO (US); Michael L. Lanser, Holland, MI (US); Balázs I. Váci, Százhalombatta (HU)

(73) Assignee: Innotec, Corp., Zeeland, MI (US)

( * ) Notice: Subject to any disclaimer, the term of this patent is extended or adjusted under 35 U.S.C. 154(b) by 0 days.

(21) Appl. No.: 18/280,350

(22) PCT Filed: Mar. 7, 2022

(86) PCT No.: PCT/US2022/019099
§ 371 (c)(1),
(2) Date: Sep. 5, 2023

(87) PCT Pub. No.: WO2022/192117
PCT Pub. Date: Sep. 15, 2022

(65) Prior Publication Data
US 2024/0068642 A1    Feb. 29, 2024

Related U.S. Application Data

(60) Provisional application No. 63/157,996, filed on Mar. 8, 2021.

(51) Int. Cl.
*F21V 11/08* (2006.01)
*F21S 41/20* (2018.01)
*F21S 41/40* (2018.01)

(52) U.S. Cl.
CPC ............ *F21V 11/08* (2013.01); *F21S 41/285* (2018.01); *F21S 41/40* (2018.01)

(58) Field of Classification Search
CPC .. F21S 41/143; F21S 41/19–195; F21S 41/27; F21V 11/08–14; F21W 2103/60; G03B 21/001; G03B 21/145; G03B 21/16
See application file for complete search history.

(56) References Cited

U.S. PATENT DOCUMENTS 5,842,761 A  * 12/1998 Futakami .......... G02F 1/133385
                                                    353/57
8,371,723 B2 *  2/2013 Nall ........................ F21S 4/10
                                                    362/249.02

(Continued)

FOREIGN PATENT DOCUMENTS

JP            4944420 B2    5/2012

OTHER PUBLICATIONS

Search Report and Written Opinion of Priority Application No. PCT/US2022/019099, dated May 26, 2022.

*Primary Examiner* — Jason M Han
(74) *Attorney, Agent, or Firm* — Warner Norcross + Judd LLP

(57) ABSTRACT

A light projector including a light source coupled to a base and a lens assembly. A sheath can be overmolded over the base and can form a locator sleeve. An aperture can be overmolded over the light source. The locator sleeve can fix the spatial relationship between the light source and the lens assembly. The lens assembly can include a spacer to fix the spatial relationship between two or more lenses in the lens assembly. A thermal management system can be coupled to the sheath to help reduce the temperature of the light projector.

13 Claims, 4 Drawing Sheets

(56) References Cited

U.S. PATENT DOCUMENTS

| | | | |
|---|---|---|---|
| 9,726,340 B2 * | 8/2017 | Seko | .................... F21S 41/155 |
| 2005/0237415 A1 | 10/2005 | Kong et al. | |
| 2006/0033889 A1 | 2/2006 | Terashima et al. | |
| 2007/0121326 A1 | 5/2007 | Nall et al. | |
| 2008/0260376 A1 | 10/2008 | Yoshibe et al. | |
| 2012/0307214 A1 | 12/2012 | Koyama et al. | |

* cited by examiner

LIGHT PROJECTOR WITH OVERMOLDING TO IMPROVE ACCURACY BETWEEN LIGHT SOURCE, APERTURE, AND LENS

BACKGROUND OF THE INVENTION

The present invention relates to light projectors, and more particularly to such projectors with improved alignment of a light source, an aperture, and one or more lenses.

Current light projectors typically include an aperture and a lens pack secured to a printed circuit board ("PCB") aligned with a light source on the PCB. The aperture and the lens pack have physical features that locate directly against the light source and/or within a locating hole in the PCB. The assembly locating features align the aperture and the lens pack with the light source. This design introduces variation into the overall assembly that can negatively affect the projected image. Although the assembly locating features are designed with a minimal clearance, they introduce variation in a tolerance stack up. Increasing the number of pieces included in the assembly increases the total variation in the overall tolerance stack up, which degrades the quality and the consistency of the projected image.

SUMMARY OF THE INVENTION

In one aspect, a light projector is provided including a light source attached to a base and a lens assembly including a first lens. A sheath can at least partially surround the light source and the lens assembly. The sheath can include a locator sleeve configured to fix the location of the lens assembly relative to the light source. The light projector can include an aperture above the light source.

In one aspect, a method of manufacturing a light projector is provided. The light source can be attached to the base. A base of the sheath can be overmolded to the base. A side of the sheath can be overmolded around the base and the light source. The aperture can be overmolded over the light source. The locator sleeve can be defined in the side of the sheath. The locator sleeve can be configured to fix the location of the lens assembly relative to the light source. The lens assembly can be placed on the locator sleeve.

In another aspect, a light projector is provided. The light projector can include a light source coupled to a light source base and a lens assembly including a first lens and a second lens. A sheath can at least partially surround the light source and the lens assembly. The sheath can include a sheath base coupled to the light source base and a locator sleeve configured to fix the spatial relationship between the light source and the lens assembly. An aperture can be located above the light source. A thermal management system configured to reduce the temperature of the light projector can at least partially surround the sheath.

These and other objects, advantages, and features of the invention will be more fully understood and appreciated by reference to the description of the current aspects and the drawings.

DESCRIPTION OF THE CURRENT ASPECTS

Figure 1:
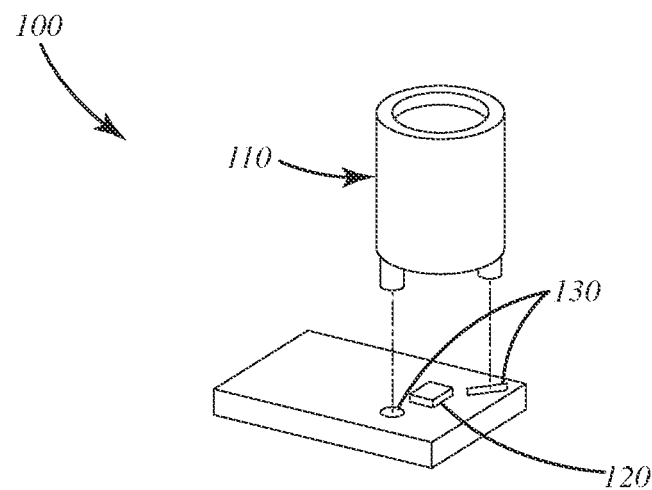
FIG. 1 is a prior art light projector according to one aspect.

Before the aspects of the invention are explained in detail, it is to be understood that the invention is not limited to the details of operation or to the details of construction and the arrangement of the components set forth in the following description or illustrated in the drawings. The invention may be implemented in various other aspects and may be practiced or may be carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various aspects. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

FIGS. 1-4 show prior art constructions of a light projector according to various aspects. In FIG. 1, a prior art light projector 100 is shown. The light projector 100 includes a lens pack 110, light source 120, and assembly locating features 130. The lens pack 110 is situated over the light source 120 using the assembly locating features 130. The tolerance in the assembly locating features means the lens pack 110 can be misaligned with respect to the light source 120, which can degrade the quality and consistency of the image projected from the light projector 100.

Figure 2:
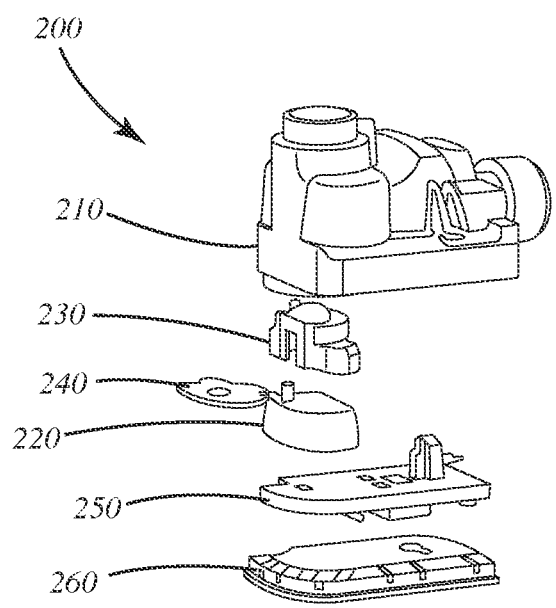
FIG. 2 is a prior art light projector according to one aspect.
Figure 3:
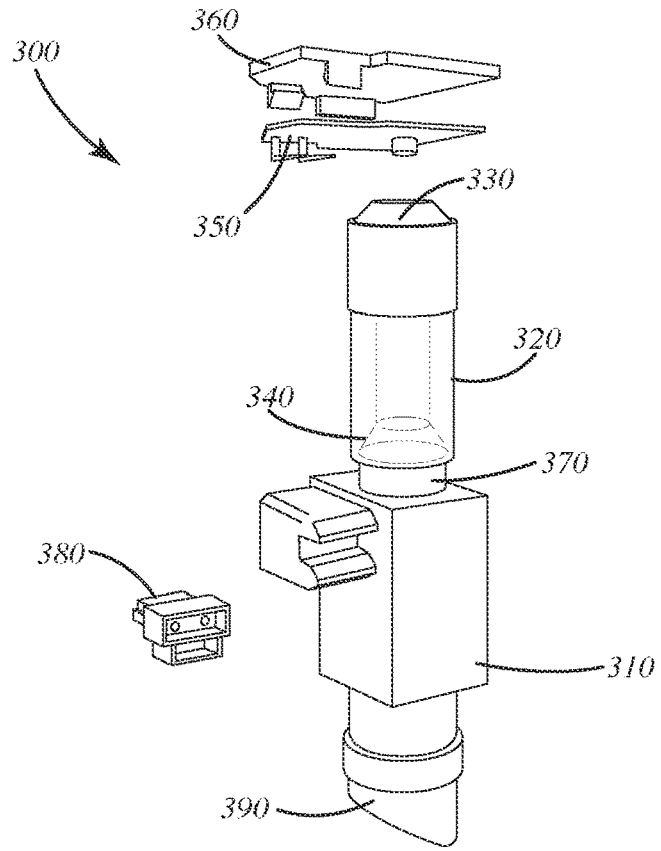
FIG. 3 is a prior art light projector according to one aspect.

FIG. 2 shows a prior art light projector 200 according to one aspect. The light projector 200 includes a housing 210, a first lens 220, a second lens 230, an image 240, a printed circuit board assembly ("PCBA") 250, and an encapsulant 260. All of these parts stack together to form the light projector 200. Each part may be misaligned and the misalignment can negatively affect the quality and consistency of the projected image. Similarly, FIG. 3 shows a prior art light projector 300 according to one aspect that includes many parts that stack together to form the light projector 300. The light projector 300 includes a housing 310, a collimator 320, a collector lens 330, a film 340, a PCB 350 including a light source, a cover lid 360, an amplifying lens 370, a connector 380, and a cover lens 390.

Figure 4:
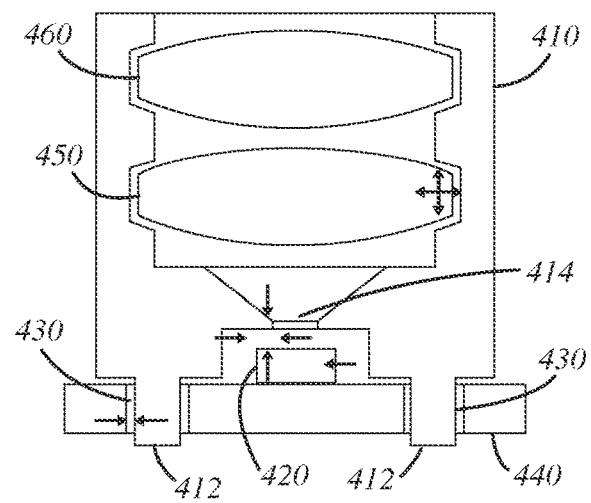
FIG. 4 is a prior art light projector according to one aspect.

FIG. 4 shows a prior art light projector 400 according to one aspect. The light projector 400 includes a lens pack 410, locators 412, an aperture 414, a light source 420, assembly locating features 430, a base 440, and a lens assembly including a first lens 450 and a second lens 460. The light projector 400 has at least four sources of variation that can affect the quality and consistency of the projected image. First, the placement of the light source 420 on the base 440 can vary. Second, the position of the locators 412 in the assembly locating features 430. Third, the position of each of the first lens 450 and the second lens 460 can vary within the lens pack in both the vertical and horizontal direction. Fourth, the aperture 414 can be misaligned with respect to the light source 420.

Figure 5:
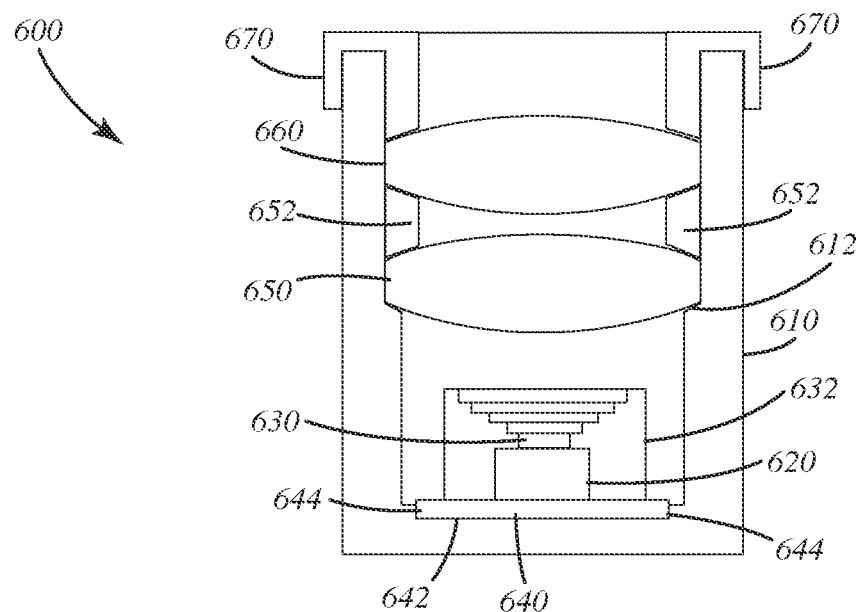
FIG. 5 is a light projector according to one aspect.

In FIG. 5, a light projector 600 according to one aspect is shown. The features of the light projectors according to various aspects described throughout this disclosure can be used independently or in combination. The light projector 600 includes a light source 620 attached to a base 640. In one aspect, the light source 620 can be a light emitting diode ("LED"). In one aspect, the base 640 is a PCB. The base 640 can alternately be referred to as a light source base. The light projector 600 includes a lens assembly including a first lens 650 and a second lens 660. In an alternate aspect, the lens assembly can include one lens. In yet another aspect, the lens assembly can include more than two lenses. A sheath 610 can at least partially surround the light source 620, the base 640, and the lens assembly. As depicted, the sheath 610 is overmolded over a bottom surface 642 and a side surface 644 of the base 640. In an alternate aspect, the sheath 610 can also be overmolded over a top surface of the base 640. In one aspect, the sheath 610 can be overmolded such that the sheath 610 contacts the light source 620 on at least one surface. By overmolding the sheath 610, the light projector 600 can have a reduced number of pieces when compared to the prior art. This can reduce the total tolerance stack up variation, and, therefore, can produce a light projector 600 that can have higher consistency and image quality than past solutions.

The light projector 600 includes an aperture 630 above the light source 620. As depicted, the aperture 630 is formed in an aperture sleeve 632. In one aspect, the aperture 630 is an opening above the light source 620. In another aspect, the aperture 630 is an opaque material over the light source 620. An aperture sleeve 632 can be overmolded directly onto the light source 620. In one aspect, the aperture sleeve 632 can be an opaque material. In one aspect, the aperture 630 can be formed from the sheath 610. As depicted, the aperture 630 has a stepped or graduated shape. Put another way, the depicted aperture 630 has a first, narrower width at the light source 620 and a second, wider width at the terminating end of the aperture 630. In one aspect, the aperture 630 can be the width of the light source. In an alternate aspect, the aperture 630 can be narrower than an emission surface of the light source 620. If the light source 620 changes position in the x or y direction on the base 640 and the aperture 630 is narrower than the emission surface of the light source 620, then the net size and location of the light source 620 does not move relative to the molded features and the lens assembly. In one aspect, the aperture 630 can have a first width immediately above the light source and gradually increase to a second width. The aperture 630 can block stray light that can cause the projected image to appear defocused or fuzzy. One way of implementing this function is to incorporate small stair steps in a round "stadium" style design as shown in FIG. 5. This geometry helps reduce reflected light rays. The closer the aperture 630 is to the light source 620, the more effective it can be. In one aspect, the aperture 630 can additionally be molded over the light source 620 (rather than just around the light source 620) in order to control the size and location of the light emission surface. It is noted that, in cases where the aperture 630 is not smaller than the emission surface, the larger overall aperture is still used.

The sheath 610 can define a locator sleeve 612. The locator sleeve 612 can be configured to fix the location of the lens assembly relative to the light source 620. The first lens 650 can rest on the locator sleeve 612. The locator sleeve 612 allows the sheath 610 to be manufactured without interruption because the lens assembly can be placed on the locator sleeve when the sheath 610 has been fully overmolded. Utilizing one molding step can reduce the manufacturing time and the potential to introduce misalignment between molding steps. In one aspect, the locator sleeve 612 and any other features that locate the lens assembly can be molded in the same molding step and from the same material as the aperture sleeve 632.

As depicted in FIG. 5, the lens assembly includes two spacers 652 between the first lens 650 and the second lens 660. The spacers 652 may alternately be referred to as a step. The spacers 652 fix the location of the first lens 650 with respect to the second lens 660. Put another way, the spacers 652 can be used to locate the first lens 650 and the second lens 660 in the x direction. In an alternate aspect, the lens assembly can include any suitable number of spacers 652 to fix the spatial relationship between the first lens 650 and the second lens 660. For example, the lens assembly can include one spacer 652 that is shaped to span the perimeter of the first lens 650 and the second lens 660. The light projector 600 can include at least one cap 670 to secure the lens assembly to the locator sleeve 612. As depicted, the cap 670 can be sized to fit over the terminating edge of the sheath 610 to contact the second lens 660. The spacers 652 and the cap 670 can allow the sheath 610 to be more easily molded because the sheath 610 can define the locator sleeve 612 to locate the lens assembly rather than individual features to locate each lens in the lens assembly separately. In one aspect, the sheath 610 can be made from a resin configured to reduce the temperature of the light projector 600.

Figure 6:
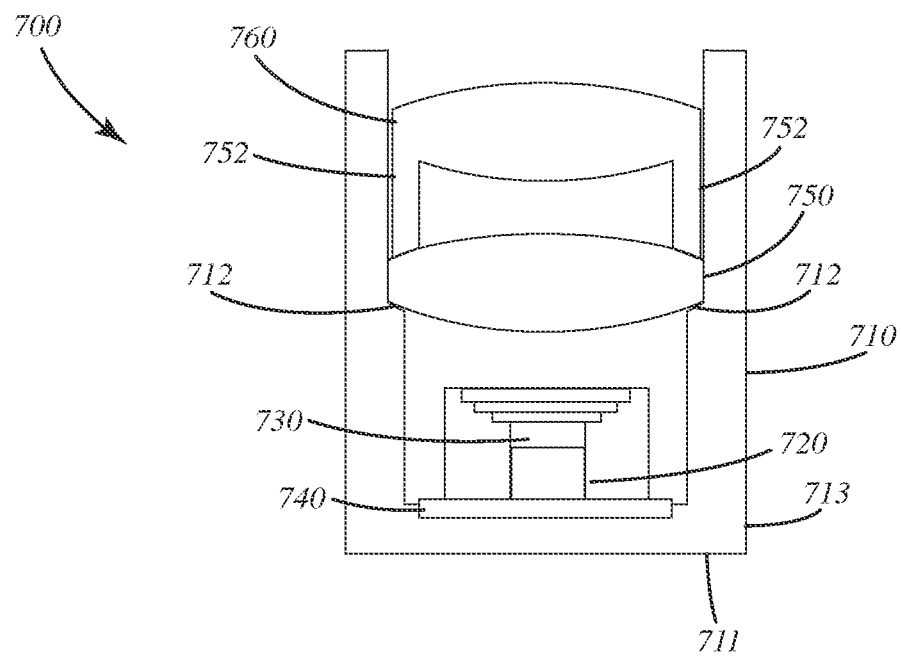
FIG. 6 is a light projector according to one aspect.

FIG. 6 shows a light projector 700 according to one aspect. The light projector 700 includes a lens assembly including a first lens 750 and a second lens 760. A locator sleeve 712 in a sheath 710 can fix the spatial relationship between a light source 720 and its corresponding aperture 730 and the lens assembly. As depicted, the second lens 760 has spacers 752 integrated into it. This construction reduces the number of parts in the light projector 700 and makes the light projector 700 easier to manufacture. Integrating the spacers 752 into the second lens 760 reduces the possibility that the lens assembly can become misaligned and affect the quality and consistency of the projected image. In an alternate aspect, the first lens 750, the second lens 760, and the spacers 752 can be integrated into one part. Put another way, the lens assembly can be one piece of material.

In one aspect, the light projector 700 can be manufactured using the following method. The light source 720 can be attached to a base 740. A base 711 of the sheath 710 can be overmolded over the base 740. A side 713 of the sheath 710 can be overmolded to extend from the base 711. The side 713 of the sheath 710 can go around the base 740 and the light source 720. The aperture 730 can be overmolded over the light source 720. As depicted, the aperture 730 is formed in an aperture sleeve 732. The aperture sleeve 732 can be overmolded over the light source 720. In an alternate aspect, the side 713 of the sheath 710 can contact the light source 720. In one aspect, the side 713 of the sheath 710 can contact a side of the light source 720. In one aspect, the aperture 730 can be integral to the side 713 of the sheath 710. The locator sleeve 712 can be defined in the side 713 of the sheath 710. The lens assembly can be placed on the locator sleeve 712.

Figure 7:
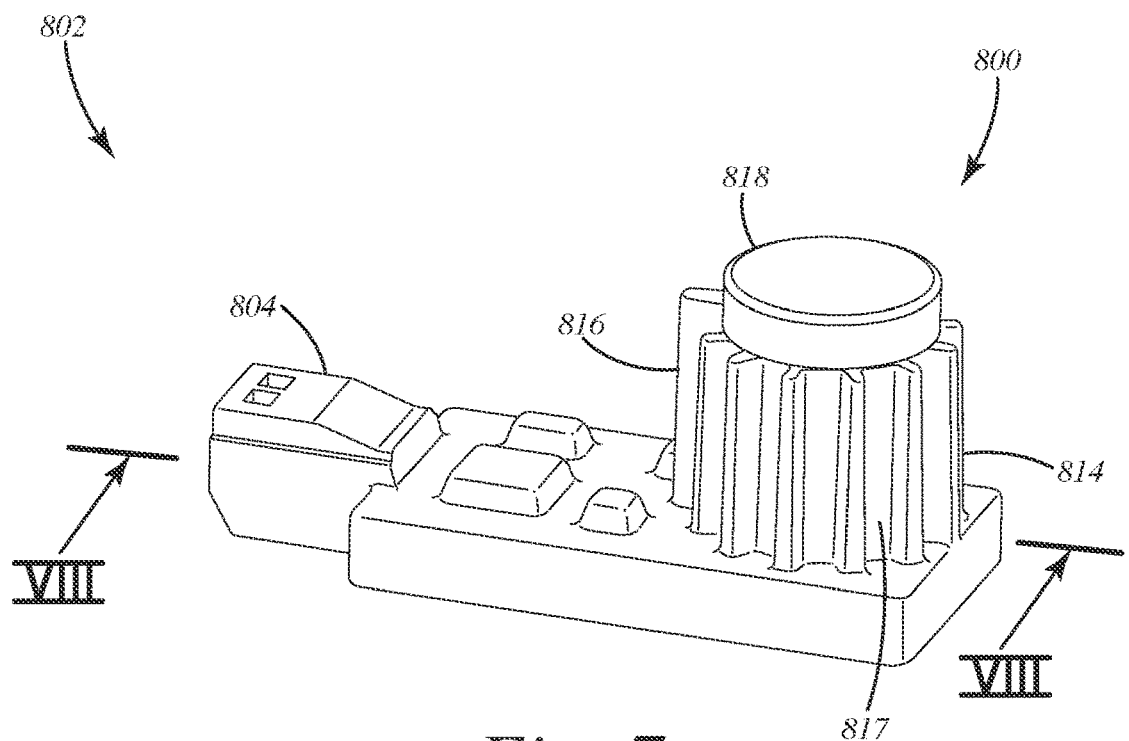
FIG. 7 is an automotive projector lamp including a light projector according to one aspect.
Figure 8:
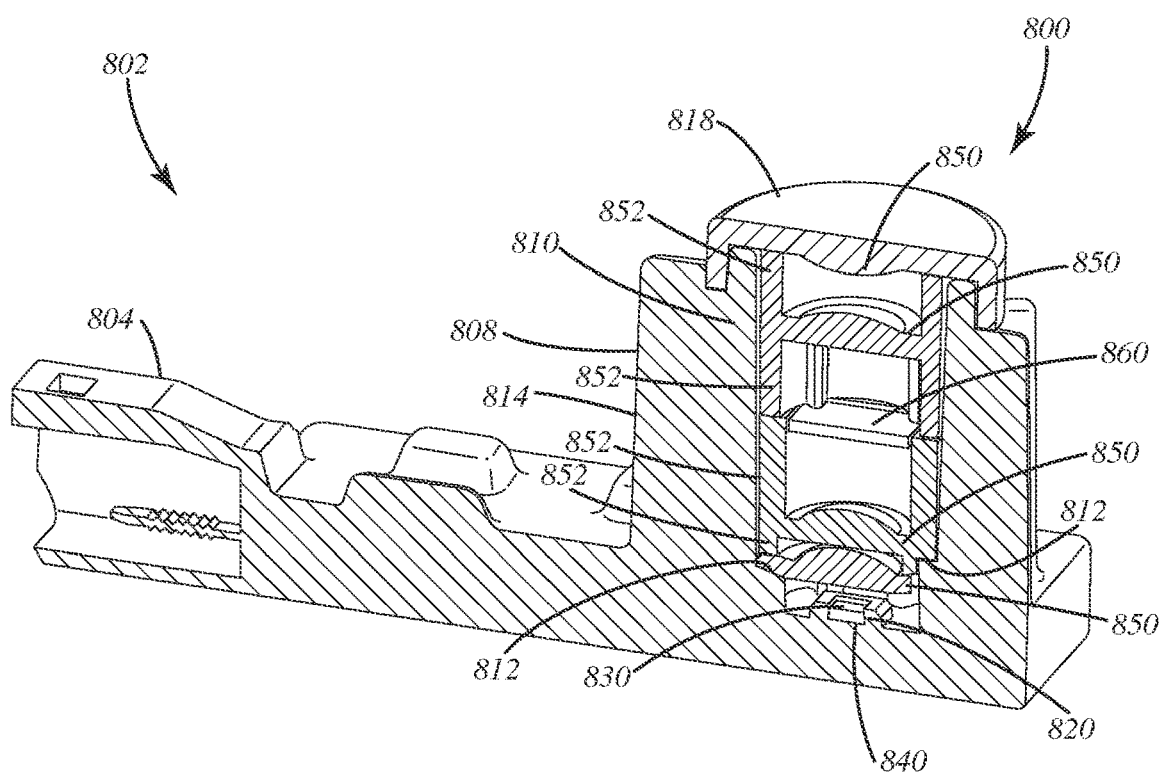
FIG. 8 is a cross-sectional view of the automotive projector lamp of FIG. 7 along the line VIII-VIII.

FIG. 7 shows an automotive projector lamp 802 including a lamp housing 804 and a light projector 800 according to one aspect. The lamp housing 804 can alternately be referred to as a light engine housing. FIG. 8 shows a cross-sectional view of the automotive projector lamp 802 along the line VIII-VIII. The light projector 800 can include a light source 820 coupled to a base 840 and a lens assembly including four projector lenses 850. In an alternate aspect, the light projector can include fewer or more projector lenses 850 depending on the application. An aperture 830 can direct light emitted from the light source 820 to the projector lenses 850. As depicted, the lens assembly also includes spacers 852 between the projector lenses 850 to fix the spatial relationship of the projector lenses 850 with respect to each other. In one aspect, the spacers 852 can be integral to one or more of the projector lenses 850. In another aspect, the spacers 852 can be separate components from the projector lenses 850.

The light projector 800 can include a lens pack structure 808. The lens pack structure 808 can alternately be referred to as a housing or a lens pack housing. The lens pack structure can include a sheath 810 and a thermal management system 814. The sheath 810 can define a locator sleeve 812. As depicted, the locator sleeve 812 has two heights along two edges. Along one edge, the locator sleeve 812 contacts the lowest projector lens 850 and along another edge the locator sleeve 812 contacts the second lowest projector lens 850. The thermal management system 814 can be seen more clearly in FIG. 7. As depicted, the thermal management system 814 fully surrounds the side of the sheath 810. In an alternate aspect, the thermal management system 814 can partially surround the sheath 810. The thermal management system 814 can define at least one thermal management feature 816 configured to reduce the temperature of the light projector 800. The thermal management feature 816 can alternately be referred to as a geometric feature. As depicted, the thermal management features 816 are ribs extending from an outer surface 817 of the thermal management system 814. The thermal management feature 816 can help to conduct heat up along the outer surface 817. The thermal management features 816 increase the overall surface area of the lens pack structure 808, which thereby increases the heat flow to the surrounding air. In an alternate aspect, the thermal management feature 816 can be any other feature configured to reduce the temperature of the light projector 800. In one aspect, the thermal management system 814 can be coupled to the base 840. A cover 818 can top the lens pack structure 808. As seen in FIG. 8, the cover 818 can fit over the terminating edge of the sheath 810. In one aspect, the cover 818 can be sealed to the sheath 810, for example through a friction fit. As seen in FIG. 8, one of the projector lenses 850 can be incorporated in the cover 818. In an alternate aspect, the cover 818 can be located above the projector lens 850.

The material of the lens pack structure 808 can be selected to enhance the thermal conductivity of the lens pack structure 808, which improves the heat conduction to all the surface areas of the light projector 800. This can improve the overall thermal management of the light projector 800 and can reduce temperature rise at the light source 820. In one aspect, the material of the lens pack structure 808 can be a plastic material or resin. In one aspect, the plastic material under and around the light source 820 can have a higher thermal conductivity than standard plastic materials.

The aspects shown in FIGS. 7-8 are a miniature projector lamp for automotive use. However, the light projectors described throughout the disclosure could be used in other applications where the position of a light source relative to an optical system is important. Exemplary applications include, but are not limited to: larger projectors for commercial or residential use; point of purchase and wayfinding; flashlights; medical headlamps; and LED headlamps on vehicles.

The above description is that of current aspects of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all aspects of the invention or to limit the scope of the claims to the specific elements illustrated or described in connection with these aspects. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed aspects include a plurality of features that are described in concert and that might cooperatively provide a collection of benefits. The present invention is not limited to only those aspects that include all of these features or that provide all of the stated benefits, except to the extent otherwise expressly set forth in the issued claims.

Further, the disclosed aspects include a plurality of features that are described in concert and that might cooperatively provide a collection of benefits. The present invention is not limited to only those aspects that include all of these features or that provide all of the stated benefits.

Terms like "preferably," "commonly," and "typically," when utilized herein, are not utilized to limit the scope of the invention or to imply that certain features are critical, essential, or even important to the structure or function of the invention. Rather, these terms are merely intended to identify particular aspects of an aspect of the present disclosure or to emphasize alternative or additional features that may or may not be utilized in a particular aspect of the present disclosure.

For the purposes of describing and defining the present invention it is noted that the terms "substantially," "about," and approximately" are utilized herein to represent the inherent degree of uncertainty that may be attributed to any quantitative comparison, value, measurement, or other representation. The terms "substantially," "about," and "approximately" are also utilized herein to represent the degree by which a quantitative representation may vary from a stated reference without resulting in a change in the basic function of the subject matter at issue.

Features of various aspects may be used in combination with features from other aspects. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the aspects shown in the illustrations. The use of directional terms should not be interpreted to limit the invention to any specific orientation(s). Any reference to claim elements in the singular, for example, using the articles "a," "an," "the," oar "said," is not to be construed as limiting the element to the singular.

Having described the subject matter of the present disclosure in detail and by reference to specific aspects thereof, it is noted that the various details disclosed herein should not be taken to imply that these details relate to elements that are essential components of the various aspects described herein, even in cases where a particular element is illustrated in each of the drawings that accompany the present description. Further, it will be apparent that modifications and variations are possible without departing from the scope of the invention. More specifically, although some aspects of the present disclosure are identified herein as preferred or particularly advantageous, it is contemplated that the present disclosure is not necessarily limited to these aspects.

The aspects of the invention in which an exclusive property or privilege is claimed are defined as follows:

1. A light projector comprising:
    a light source having a width;
    a light source base supporting the light source, the light source base having a bottom surface and a side surface;
    a molded sheath at least partially surrounding the light source and the light source base, the sheath overmolded over the bottom surface and the side surface of the light source base, the sheath including a locator step;
    a molded aperture sleeve defining an aperture having a width, the aperture sleeve overmolded onto the light source, the aperture aligned with the light source, the width of the aperture being the same or narrower than the width of the light source; and
    a lens assembly including at least a first lens, the lens assembly engaging the locator step within the sheath, whereby the lens assembly is in a fixed spatial relationship with respect to the light source.

2. The light projector of claim 1, wherein the aperture is narrower than the width of the light source.

3. The light projector of claim 1, wherein the aperture has a first width adjacent the light source and gradually increasing to a second width.

4. The light projector of claim 1, wherein the lens assembly includes a second lens and a spacer between the first lens and the second lens, the spacer configured to set the distance between the first lens and the second lens.

5. The light projector of claim 4, wherein the spacer is integral to the second lens.

6. The light projector of claim 1, further comprising:
    a thermal management system at least partially surrounding the sheath, the thermal management system defining at least one thermal management feature configured to reduce the temperature of the light projector.

7. The light projector of claim 6, wherein the thermal management system and the sheath form one integral component.

8. The light projector of claim 1, wherein the sheath is made from a resin configured to reduce the temperature of the light projector.

9. The light projector of claim 1, wherein the sheath is overmolded over the lens assembly.

10. A light projector comprising:
    a light source base having a bottom surface and a side surface;
    a light source supported by the light source base and having a width;
    a unitary molded sheath surrounding the light source and the light source base, the sheath including:
        a sheath base overmolded over the bottom surface and the side surface of the light source base; and
        a sheath sleeve including a locator step;
        the sheath further overmolded over the light source and defining an aperture aligned with the light source, the aperture having a width the same as or narrower than the width of the light source;
    a lens assembly including at least a first lens, the lens assembly engaging the locator step within the sheath sleeve, whereby the lens assembly is in a fixed spatial relationship with respect to the light source; and
    a thermal management system at least partially surrounding the sheath.

11. The light projector of claim 10, wherein the aperture has a first width immediately above the light source and gradually increases to a second width.

12. The light projector of claim 10, wherein the lens assembly includes a second lens and at least one spacer between the first lens and the second lens, the at least one spacer configured to set the spatial relationship between the first lens and the second lens.

13. The light projector of claim 10, wherein the at least one spacer is integral with the second lens.

* * * * *